United States Patent [19]

Gorman et al.

[11] 4,398,731
[45] Aug. 16, 1983

[54] Y-INTERLOCK PACKING SEAL

[75] Inventors: Gerald W. Gorman, Duncanville, Tex.; Hal W. Gorman, Rte. 2, Box 320, Midlothian, Tex. 76065

[73] Assignee: Hal W. Gorman, Midlothian, Tex.

[21] Appl. No.: 375,801

[22] Filed: May 7, 1982

[51] Int. Cl.³ .............................................. F16J 15/22
[52] U.S. Cl. .................................... 277/124; 277/125; 277/205; 277/207 R
[58] Field of Search ........................... 277/1, 123–125, 277/205, 206 R, 206 A, 207 R, 209–211

[56] References Cited

U.S. PATENT DOCUMENTS

| | | | |
|---|---|---|---|
| 2,264,147 | 11/1941 | Dunlevy | 277/124 |
| 2,706,655 | 4/1955 | Showalter | 277/124 |
| 3,147,984 | 9/1964 | Benoit | 277/211 X |
| 3,174,761 | 3/1965 | Workman | 277/206 X |
| 3,288,475 | 11/1966 | Benoit | 277/205 |
| 3,586,341 | 6/1971 | Whittaker et al. | 277/124 |
| 3,790,179 | 2/1974 | Scannell | 277/124 |
| 3,915,463 | 10/1975 | Pippert | 277/205 |
| 4,053,163 | 10/1977 | Vegella | 277/205 X |

FOREIGN PATENT DOCUMENTS 45-16482  8/1970  Japan .................................. 277/205

Primary Examiner—Robert S. Ward, Jr.
Attorney, Agent, or Firm—Wofford, Fails & Zobal

[57] ABSTRACT

A packing seal characterized by a plurality of rings formed from extruded lineal members. The extruded lineal members each have a height h from top to bottom, a width ΔR, a pair of heels that slope outwardly from the sidewalls of the top to near a substantially flat bottom, the bottom having a groove disposed intermediate the heels and adapted to receive a linear anti-roll tab from a contiguous ring therebeneath. The top lineal member has a substantially flat top without the anti-roll tab for being contiguous a gland ring. Dimensions of the respective dimensions, which are critical to operation of the seal at low pressure and high pressure, are disclosed and claimed; as are suitable mechanical pressure inducing mechanism and flow blocks that are employed to ensure and complete the seal.

7 Claims, 9 Drawing Figures

Y-INTERLOCK PACKING SEAL

FIELD OF THE INVENTION

This invention relates to seals. More particularly, this invention relates to packing seals for use in a plurality of rings inside a packing gland to form the desired seal sealingly engaging a cylindrical shaft or rod and the surrounding cylindrical walls to contain a fluid that would otherwise flow out the annular space intermediate the rod and the walls.

DESCRIPTION OF THE PRIOR ART

The prior art has seen the development of an astonishingly wide variety of seals for sealing annular spaces intermediate shafts or rods and surrounding walls. These types of seals have ranged from exceptionally complex and intricate high pressure seals to relatively less expensive seal glands employing packing material. Ordinarily, these latter types of inexpensive seal glands have suffered from the defect that the seal material that was employed has not been able to stop leaks with minimal friction, but has relied upon merely attenuating the flow and replacing packing material or tightening down on the packing material when the flow became unacceptable. Also, the use of sealing rings requires adapter rings costing as much or more than the individual V-shaped rings that attenuated the flow.

It is desirable that these relatively economical types of seals have the following features that are desirable but not heretofore provided.

1. Each packing seal should be able to be formed into a seal ring that is employable with standard seal parts.
2. The packing seal should form seal rings that can have the seal initiated with slight mechanical pressure and that will increase the seal with increasing fluid pressure.
3. The packing seal should have flat horizontal surfaces to avoid rocking as did the prior art type material.
4. The packing ring should further accommodate a locking ring, or ring of anti-roll tab, to prevent twisting of the material.
5. The packing seal should form seals with less friction than the prior art type materials.
6. The packing seal should be adapted to be formed into a plurality of rings and each be joined square with the radial but angled with the horizontal at angles of about 45° such that the joinder can be offset to form seals.
7. The packing seal should be formable economically as by extrusion through a single sized die within predetermined ranges.

From the foregoing it can be seen that the prior art has not been successful in providing economical seals that had the desirable features delineated.

SUMMARY OF THE INVENTION

Accordingly, it is an object of this invention to provide a seal and packing seal material therefore that had a plurality of the features delineated hereinbefore as desirable and not heretofore provided.

It is a specific object of this invention to provide a seal having two type of packing seals that provide all of the features delineated hereinbefore as being advantageous and not heretofore provided.

These and other objects will become apparent from the descriptive matter hereinafter, particularly when taken in conjunction with the appended drawings.

In accordance with one embodiment of this invention, there is provided a packing seal comprising an extruded lineal member of elastomeric material having in cross section a height h from top to bottom, a width $\Delta R$, a pair of heels that slope outwardly from the side walls of the top to form a substantially flat bottom, the bottom haing a groove to disposed intermediate the heels and adapted to receive a linear and anti-roll tab from a contiguous ring therebeneath. The top ring, as this ring is called, serves to both adapt to a "square packing box" (in cross section) and to seal against flow of fluid. The linear member has substantially flat top and bottom for being contiguous another ring when formed into rings and placed into a seal.

In preferred embodiments, the packing seal is formed into a ring in conjunction with a ring of a similar packing seal that has the linear anti-roll tab disposed on its top and disposed laterally so as to matingly engage the groove on the bottom of the adjacent ring of packing seal material placed in top-to-bottom relationship within a seal gland.

In accordance with another embodiment of this invention, a seal is formed by having adjacent a gland ring, a ring of the packing seal with a flat top and having contiguous the top ring one or more additional rings of the packing seal having the linear anti-roll tap disposed matingly engaging the groove in the bottom of the contiguous ring of packing seal material and having mechanical pressure to initiate the seal supplied by suitable means including a bottom ring engaging the bottom ring of packing seal in the seal gland. As illustrated in FIGS. 1 and 3, there is mating engagement between the top of the anti-roll tab 53 and bottom of grooves 50 and between top 55 and bottom 41, respectively; and provide respective pairs of substantially cylindrical annular spaces interiorly and exteriorly of each anti-roll tab 53. A flow block is preferably employed to prevent any slow leaks lineally from joint to joint. A flow block comprises a resilient portion that is compressed intermediate contiguous anti-roll tabs and respective encompassing grooves, as will be described in more detail hereinafter.

DESCRIPTION OF PREFERRED EMBODIMENTS

Figure 1:
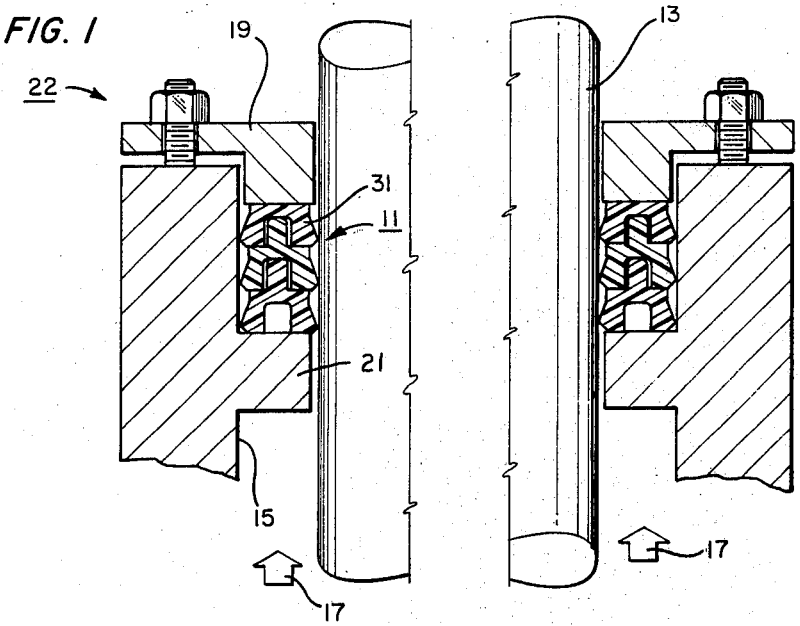
FIG. 1 is a partial cross sectional view showing one embodiment of this invention on a large cylinder such as is used in forming presses, forging presses, or the like where this invention is particularly advantageous.

FIG. 1 shows packing seal 11 in an installation for sealing intermediate a cylinderically shaped rod 13 and a surrounding, tubular, cylinder-shaped wall 15. The cylindrically shaped rod 13 may run a wide variety of sizes from as small as a few inches in diameter to as much as seven feet or more in diameter, as for elevators, forming presses, forging presses or the like. It is on these particularly large diameter rods 13 that the seals of this invention have their particular and greatest advantage; since, otherwise, the seals become inordinately expensive because of the large expense of making separate molds for forming circular rings.

Figure 2:
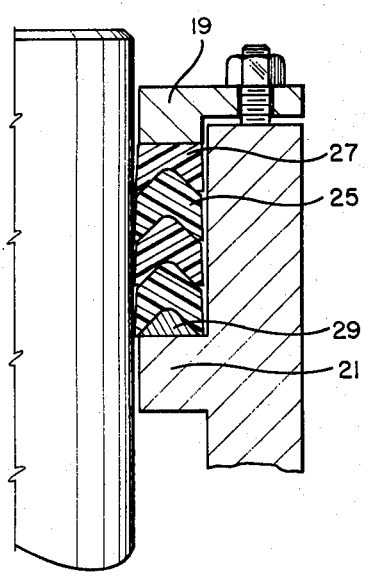
FIG. 2 is a partial cross sectional view of one embodiment of the prior art.

In accordance with this invention, packing seal 11 can be extruded in a linear form of seal and then formed into circles of needed diameters, as will become clear from the description hereinafter. Ordinarily, the cylindrically shaped rod will be formed of metal or the like. Similarly, the surrouding tubular, cylinder-shaped walls may be formed of metal or the like so as to be able to withstand the force of hydraulic fluid or the like that exerts pressure, indicated by the arrows 17 in the annular space between the rod 13 and the wall 15. The rod 13 may be a piston or the like that moves upwardly and downwardly responsive to this pressure. On the other hand, it can be shaft of a pump or the like that rotates. Usually, a gland ring 19 is employed in the seal for retaining a top of the seal in place longitudinally. There is an additional ring such as bottom ring 21 and means 22 for moving one of the top and bottom rings toward the other for applying mechanical pressure. For example, bottom ring may be moved upwardly to snap into grooves or the like or otherwise apply the mechanical pressure to set the seal in order that the fluid pressure shown by arrow 17 can further increase the seal. On the other hand, the gland ring may be moved toward the bottom ring by mating threads, bolts and nuts at appropriate intervals or the like. The gland ring, bottom ring, and the means for supplying mechanical pressure are well known and do not require further description herein. For example, the prior art has seen the development of the gland ring 19 with suitable conventional packing seals 25, FIG. 2, in between it and the bottom ring 21.

The typical prior art packing seals or material, 25 required a compatible top V-ring 27 or the like and employed in conjunction with a filler ring 29. Even this was sometimes inadequate to prevent the sealing material, or packing material, from rotating, or rocking. Moreover, in the large diameter pistons or the like, the top and bottom rings were inordinarily expensive, as were rings of packing seal that were formed to fit the respective installation.

Figure 3:
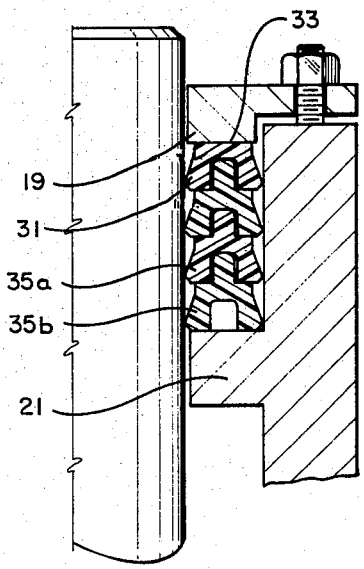
FIG. 3 is a partial cross sectional view of one embodiment of this invention used similarly to that of the prior art.
Figure 4:
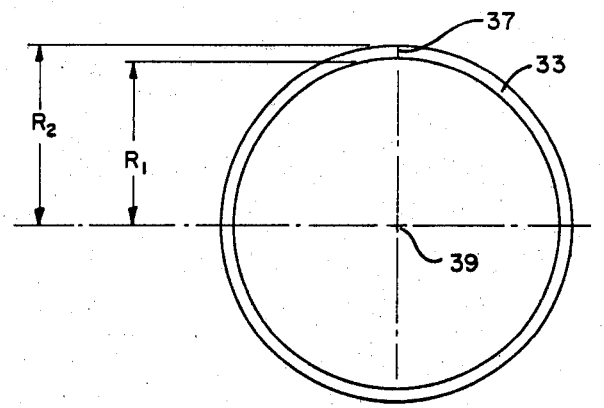
FIG. 4 is a top plan view of an extruded linear member of packing seal joined into a ring.
Figure 5:
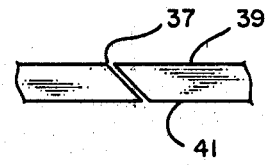
FIG. 5 is a partial side elevational view showing the ends joined in the ring of FIG. 4.
Figure 7:
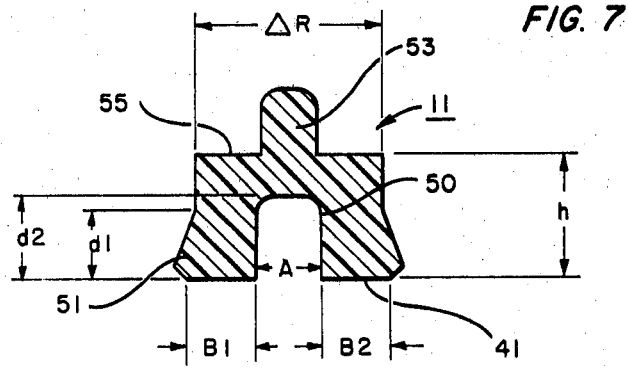
FIG. 7 is a cross sectional view of the packing seal of FIG. 6.

In accordance with this invention, there is a top ring 31, FIGS. 1 and 3, that has a flat top and bottom 33, 41, FIG. 7, and is stacked contiguous a plurality of additional rings 35a, 35b, FIG. 3. In the illustrated embodiment, the packing material 31, 35a, 35b are formed by linear extrusion, as illustrated in FIG. 3 and described in more detail hereinafter, and joined as shown in FIGS. 4 and 5. Referring to FIG. 4, the ring of packing seal 33 has a cut 37 that is along a radial from the center 39. This is close to a square cut, particularly in large diameter seals. As can be seen in FIG. 5, from the side however, the cut 37 is diagonal with respect to the top of the roll tab 39, or the bottom 41. The diagonal is preferrably about 45° although it may be cut as little as 30° on the acute angle side.

Figure 6:
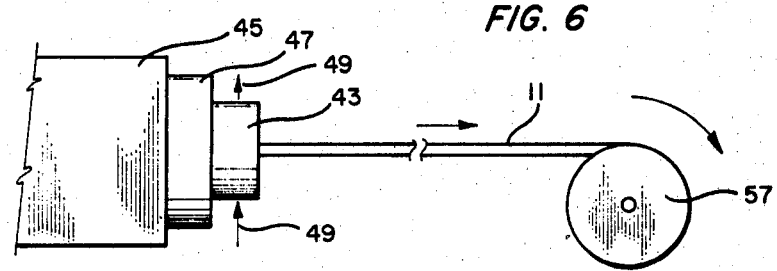
FIG. 6 is a schematic view of the extrusion apparatus for extruding the lineal packing seal of FIG. 1.

As can be seen in FIG. 6, the packing seal 11 is extruded from a heated die 43. The extrusion is carried out conventionally by using elastomeric material in the main mixing apparatus 45 and then pressurizing it through the pressurizer 47 and the heated die 43. Suitable fluid flows through the conduit 49 for heating the die in accordance with conventional extrusion processes. These conventional extrusion processes do not need to be described in detail herein. Conventionally the mixer will mix into liquid form the material such as grunular polymer, monomers, rubbers, powders or pellets that are to be reacted or melted. In any event, a viscous liquid mass is formed. The pressurizer 47 compresses the viscous liquid mass to send it through the dies 43 that form it into the desired lineal seal 11. The seal 11 can be pulled through a tank of cold water or the like to further chill the sealing material that has been formed into the desired shape.

The desired shape is indicated in cross-section in FIG. 7.

As can be seen, the packing seal 11 has a height h from top to bottom, a width $\Delta R$, a pair of heels 51 that slope outwardly from the sidewalls extending downwardly from the top to form a substantially flat bottom 41. The bottom 41 has therein a groove 51 disposed intermediate the heels 41 and adapted to receive a linear anti-roll tab 53 from a contiguous ring therebeneath. In one embodiment, the linear member has a flat top 55 (33) without the tab 53. This linear member is employed as the top ring to engage the gland ring 19 in a seal. As can be appreciated, the majority of the material will, accordingly, have a roll tab 53. The packing seal material can be taken up on suitable spools 57, FIG. 6.

It has been found that, in order to have a leak free seal that is enhanced in its sealing efficacy by the fluid pressure therebeneath, the following relationship should be observed. If the lateral width of the respective heels are given the designation B1, B2, the ratio of the lateral dimension of the groove given the designation A to the sum of the two width of the heels should be in the range of 0.2–0.36. This relationship is expressed as follows:

$$ti\ 0.2 < A/B1 + B2 < 0.36 \qquad (I)$$

The exact reasons for the efficacy of this relationship is not completely understood but it has been observed in practice.

Another relationship that has been found to be vital is that the depth of the groove 50, shown in FIG. 7 as d2, must be greater than the depth of the heels 51, arbitrarily given the designation d1 in FIG. 7. Moreover, the groove 50 should receive the tab 53 of the contiguous ring so the tab 53 should have dimensions slightly less but still close enough to be conformingly received within the groove 50 and prevent rocking, or rotation of one with respect to another.

Another relationship that has been found to be advantageously controlled is that the height h between the top and the bottom of the packing seal should be greater than 0.4 times the width $\Delta R$ and less than 0.6 times the width $\Delta R$. This relationship is expressed as follows:

$$0.4\Delta R < h < 0.6\Delta R \qquad (II)$$

Again, the exact reason why this particular relationship has been found to be surprisingly effective is not fully understood.

Figure 8:
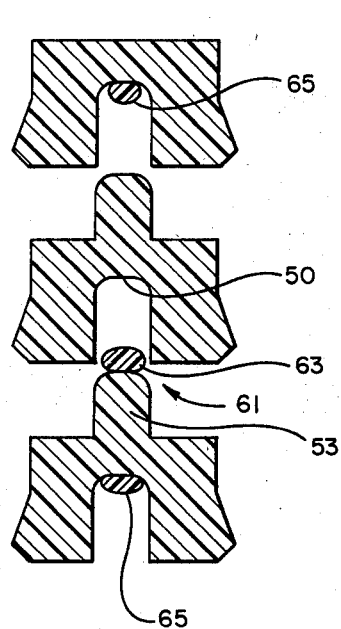
FIG. 8 is a cross sectional view of a plurality of rings of packing seal with flow blocks before compression.
Figure 9:
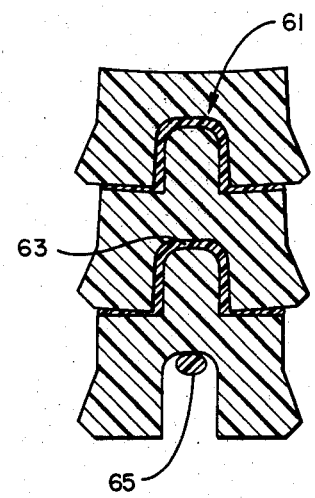
FIG. 9 is a cross sectional view of the plurality of rings of packing seal with flow blocks after compression.

Preferably, flow blocks are included in the assembly of the packing seal. The flow blocks comprise respective resilient portions that are compressed intermediate contiguous anti-roll tabs and respective encompassing grooves. Referring to FIGS. 8 and 9, the flow blocks 61 may comprise integrally formed resilient portion 63 onto the anti-roll tab 53, as illustrated, or into the top of the groove 50; or may comprise separate lineal members 65. The separate lineal members 65 are affixed, as by bonding (adhesively or thermally) to either the top of the anti-roll tab 53 or the top of the groove 50. The resilient portions need not be continuous, but may be spaced intermittently as a frequency sufficient to be emplaced between joints in respective rings. Still more preferably at least two such flow blocks should be disposed between joints, 1 on either side to previous leaks. Obviously this spacing will depend upon the diameter of the respective rings; the larger diameter rings requiring fewer flow blocks per unit length. For example, one-inch long flow blocks may be placed each six to twelve inches and perform satisfactorily in most installations for rings larger than twelve inches in diameter.

In operation, the packing seal is extruded in linear form. One of the particular advantages of this invention is that the lineal member can be extruded in one size to fit a plurality of different diameter rods within a particular range. It has been found advantageous to size the linear member that will make up the rings of packing material so as to provide about 0.020 inch interference fit on each side of the seal after the mechanical pressure is applied. A clearance of 0.005 up to 0.010 inch can be tolerated after installation and compensated for by the mechanical pressure. In any event, when it is desired to form the seal, the rings of packing seal are suitably cut at the desired angle with respect to the bottom and at angles so as to form a radial cut 37, FIG. 4 when joined together. The rings are introduced into the desired annular space intermediate the gland ring 19 and the bottom ring 21 and the mechanical pressure applied to form the seal. The mechanical pressure may range from several pounds force to many tens of pounds of force, depending upon the size, expansion to be accomplished, and the like. The mechanical pressure may be applied by moving the bottom ring to snap it into place against the gland ring 19 or pressing the gland ring downwardly against a bottom ring 21 that has been snapped into a suitable recess or the like. In any event, the mechanical pressure effects a seal. Greater fluid pressure will then only increase the seal when it acts thereon.

From the foregoing it can be seen that this packing seal of this invention is employed in making a seal that has the advantageous features delineated hereinfor and not heretofor provided. Accordingly, this invention achieves the objects delineated hereinbefore.

Although this invention has been described with a certain degree of particularity, it is understood that the present disclosure is made only by way of example and that numerous changes in the details of construction and the combination and arrangement of parts may be resorted to without departing from the spirit and the scope of the invention, reference for the latter purpose being had to the appended claims.

What is claimed is:

1. A seal sealingly engaged intermediate a cylindrically shaped rod and surrounding tubular, cylinder-shaped wall and including:
   a. a gland ring for retaining a top of said seal in place longitudinally: and
   b. means for supplying mechanical pressure to said seal, including a bottom ring: the improvement comprising:
   c. a top ring of packing seal consisting essentially of an extruded lineal member of elastomeric material having in cross-section a height h from top to bottom, a width $\Delta R$, a pair of heels that slope outwardly from said top to form a substantially flat bottom, said bottom having a groove disposed intermediate said heels and adapted to receive a linear anti-roll tab from a contiguous ring therebeneath; said lineal member having a substantially flat top contiguous said gland ring and having ends joined adjacent each other in a joint; said top ring serving both to block flow of fluid and to adapt a seal cavity to accommodate additional rings; and
   d. at least one additional ring of packing seal consisting essentially of an extruded lineal member of the elastomeric material having in cross-section height h from top to bottom, a width $\Delta R$, a pair of heels that slope outwardly from said sidewalls of said top to form substantially flat bottom, said bottom having a groove disposed intermediate said heels and adapted to receive a linear anti-roll tab from the contiguous ring therebeneath: said linear member having a substantially flat top for being contiguous said bottom of said contiguous ring at its top and having a linear anti-roll tab disposed on its top and placed laterally so as to matingly engage said groove on said bottom of said contiguous ring; the rings engaging tops to bottoms and tops of anti-roll tabs to bottoms of engaging grooves so as to form substantially cylindrical annular spaces radially interiorly and exteriorly of said anti-roll tab and within said grooves; said flat bottom of the bottom ring engaging said means for applying mechanical pressure; each said ring having its respective ends joined adjacent each other in respective joints.

2. The seal of claim 1 wherein said heels on said lineal members of said rings extend upwardly from said bottoms toward said tops for distance d1 and said grooves extend upwardly interiorly from said bottom towards said top for a distance d2 that is greater than said distance d1; and wherein said grooves have width A, said heels have respective widths B1 and B2; and the ratio of said width A to said heels is expressed by the relationship:

$$0.2 < A/(B1+B2) < 0.36.$$

3. The seal of claim 1 wherein said height of said seal from its top to bottom is within the range defined by the relationship:

$$0.4\Delta R < h < 0.6\Delta R$$

4. The seal of claim 1 wherein respective flow blocks are employed intermediate respective joints along respective rings.

5. The seal of claim 4 wherein said flow blocks comprise a continuous, compressible, resilient portion intermediate respective contiguous tops of anti-roll tab and groove.

6. The seal of claim 4 wherein said flow blocks comprise at least two intermittent, compressible, resilient portions, including one on each side of each joint, intermediate respective contiguous tops of anti-roll tab and groove.

7. The seal of claim 4 wherein said flow blocks comprise both a continuous, compressible, resilient portion intermediate at least one contiguous top of anti-roll tab and groove, and at least one series of at least two intermittent, compressible, resilient portions, including one on each side of each joint intermediate respective contiguous tops of at least one anti-roll tab and groove.

* * * * *